Patented Mar. 25, 1941

2,236,389

UNITED STATES PATENT OFFICE 2,236,389

VULCANIZATION OF RUBBER

Ira Williams, Borger, Tex., assignor to E. I. du Pont de Nemours & Company, Wilmington, Del., a corporation of Delaware No Drawing. Application October 25, 1939, Serial No. 301,155

16 Claims. (Cl. 260—784)

This invention relates to the vulcanization of rubber and more particularly to a new class of accelerators for the vulcanization of rubber.

Many dithiocarbamic acids, substituted dithiocarbamic acids and their salts, esters and sulfides are known. Ammonia, for example, reacts readily with carbon disulfide in alcoholic solution to form the ammonium salt of dithiocarbamic acid. The free acid is extremely unstable and decomposes immediately. In a similar manner, dithiocarbamic acid derivatives can be prepared from primary alkylamines. The sodium, zinc and ammonium salts of many of the dithiocarbamic acids can be prepared, as well as the sulfides and esters, but in general, these compounds decompose rather rapidly on storage, even at room temperature. Dithiocarbamates have also been prepared from imines such as piperidine. The piperidine salt of pentamethylene dithiocarbamic acid is a pale cream colored solid, which readily decomposes when in contact with even traces of moisture.

It is an object of the present invention to provide a new class of accelerators for the vulcanization of rubber. A further object is to provide a new and improved class of dithiocarbamic acid derivatives which are particularly effective for accelerating the vulcanization of rubber. A still further object is to provide an improved method of vulcanizing rubber. Other objects are to provide new compositions of matter and to advance the art. Still other objects will appear hereinafter.

The above and other objects of my invention may be accomplished by employing as accelerators for the vulcanization of rubber, derivatives of hexamethylene dithiocarbamic acid, and particularly the salts, esters and sulfides of hexamethylene dithiocarbamic acid.

Hexamethylene dithiocarbamic acid is a dithiocarbamic acid prepared from hexamethylene imine. Hexamethylene imine is readily prepared by splitting out ammonia from one molecule of 1,6 hexane diamine. This product readily reacts with carbon disulfide according to the following equation:

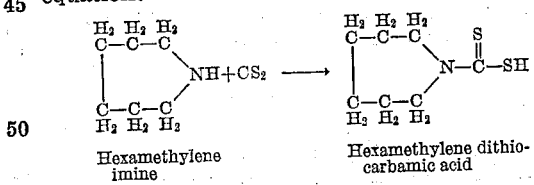

Hexamethylene imine → Hexamethylene dithiocarbamic acid

The hexamethylene dithiocarbamic acid reacts immediately with an excess of basic or salt-forming element to form a salt of the acid. Other derivatives of the hexamethylene dithiocarbamic acid can be prepared by any of the methods known to the art for preparing similar derivatives of similar dithiocarbamic acids, such as pentamethylene dithiocarbamic acid, which methods result in the replacement of the hydrogen connected to sulfur by a salt-forming group or element, or by an organic radical.

The compounds of my invention may be represented by the formula

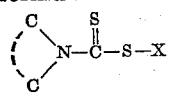

in which the group

represents a saturated carbon chain of six carbon atoms, the terminal carbon atoms of which are singly bonded to N. All of these compounds contain the radicle

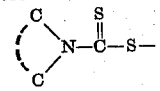

Such derivatives of hexamethylene dithiocarbamic acid are, in general, more stable than the corresponding derivatives of other heterocylic dithiocarbamic acids. The hexamethylene imine salt of hexamethylene dithiocarbamic acid, for example, is more staple than the piperidine salt of pentamethylene dithiocarbamic acid, as is shown by the following tests. Five gram samples of each of the hexamethylene imine salt of hexamethylene dithiocarbamic acid and the piperidine salt of pentamethylene dithiocarbamic acid were placed in uncovered containers in an oven held at 50° C. At the end of three weeks, the piperidine salt of pentamethylene dithiocarbamic acid had lost 52% of its weight, while the hexamethylene imine salt of hexamethylene dithiocarbamic acid had lost only 10% of its original weight.

Samples of each of the hexamethylene imine salt of hexamethylene dithiocarbamic acid and of the piperidine salt of pentamethylene dithiocarbamic acid were boiled with ten times their weight of water. The hexamethylene imine salt of hexamethylene dithiocarbamic acid was boiled for an hour with no formation of brownish flakes, while the piperidine salt of pentamethylene dithiocarbamic acid began to yield brownish flakes almost immediately upon boiling of the solution.

The formation of various derivatives of hexamethylene dithiocarbamic acid is described in the following examples.

Example I 99 grams of hexamethylene imine were dissolved in 300 grams of acetone. This solution was kept below 15° C. and well agitated while 40 grams of carbon disulfide were added slowly. The white precipitate which resulted was filtered off, washed with acetone, and dried in air. The resulting hexamethylene imine salt of hexamethylene dithiocarbamic acid was in the form of small white crystals melting at 149 to 150° C. This compound may be represented by the formula

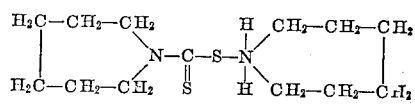

*Example II*

20 grams of sodium hydroxide were dissolved in 200 cc. of water and cooled to 5° C. 50 grams of hexamethylene imine and 38 grams of carbon disulfide were added alternately in small portions and with good stirring. The sodium salt of hexamethylene dithiocarbamic acid began to crystallize from the solution and was recovered as a white solid by evaporation of the water and drying at 110° C. This compound may be represented by the formula

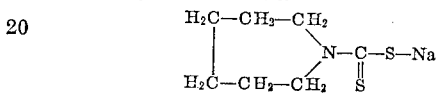

*Example III*

0.1 gram mole of the sodium salt of hexamethylene dithiocarbamic acid dissolved in 300 cc. of water at 3° C. was treated with a mixture of 100 cc. of 2% hydrogen peroxide and 0.05 mole of hydrochloric acid. When the solution had become acidic to litmus the precipitate was filtered off and crystallized from alcohol. The product was dihexamethylene thiuram disulfide. The pale cream colored crystals melted at 110° C. This compound may be represented by the formula

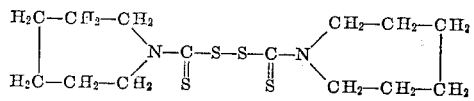

*Example IV*

0.1 gram mole of sodium hexamethylene dithiocarbamate was dissolved in 250 cc. of water containing 3 grams of sodium carbonate. Phosgene was passed through the liquid which was cooled to 5° C. until no more precipitate was formed. The carbonyl ester of hexamethylene dithiocarbamic acid having the formula

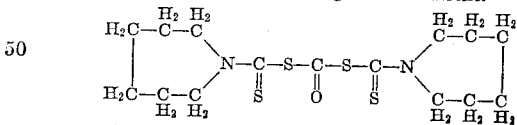

separated as a yellow waxy solid.

*Example V*

20 grams of the carbonyl ester of hexamethylene dithiocarbamic acid was heated slowly to a temperature of 80° C. Decomposition started at about 60° C. with elimination of carbon oxysulfide and the formation of the thiuram monosulfide. This product was crystallized from alcohol to form bright yellow crystals of dihexamethylene thiuram monosulfide melting at 92° C. This compound may be represented by the formula:

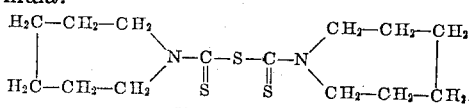

*Example VI*

0.2 gram mole of sodium hexamethylene dithiocarbamate dissolved in 600 cc. of water was treated with 0.1 gram mole of zinc chloride dissolved in 200 cc. of water. A thick white slurry of zinc hexamethylene dithiocarbamate resulted and was filtered off and washed. The dry product melted at 175° C. and had the formula

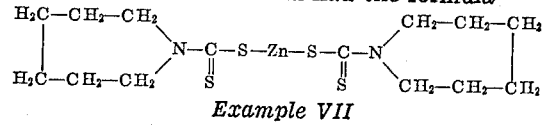

*Example VII*

The process of Example VI was repeated except that cadmium chloride was substituted for the zinc chloride. The resulting pale cream colored powder melted at 175° C. and had the formula

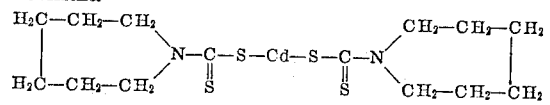

*Example VIII*

Lead acetate was substituted for the zinc chloride used in Example VI. Lead hexamethylene dithiocarbamate was obtained as a brown powder. The formula of this material is

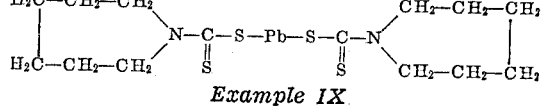

*Example IX*

0.2 gram mole of sodium hexamethylene dithiocarbamate was treated with 0.2 gram mole of benzyl chloride in 300 cc. of alcohol and held at 50° C. for 30 minutes. The precipitated sodium chloride was filtered off and the filtrate treated with water. Benzyl hexamethylene dithiocarbamate separated as a slightly viscous straw colored liquid. This compound may be represented by the formula

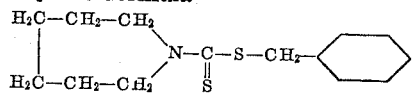

*Example X*

0.2 gram mole of sodium hexamethylene dithiocarbamate was treated with 0.2 gram mole of 2,4-dinitro-chlorobenzene in 300 cc. alcohol and heated for 30 minutes at 50° C. The reaction mass was treated with water to dissolve the sodium chloride. The residue was crystallized from alcohol to form bright yellow needles of 2,4-dinitrophenyl hexamethylene dithiocarbamate which melted at 108° C. and whose formula is

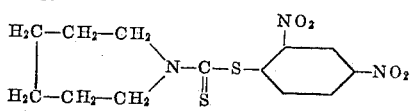

*Example XI*

The butyl ester of hexamethylene dithiocarbamic acid prepared under the conditions of Example IX was a straw colored liquid whose formula may be represented as

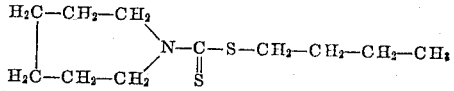

The preceding examples are given for illustrative purposes only. Numerous other derivatives of the hexamethylene dithio-carbamic acid can be prepared in a similar manner. For example, the hexamethylene dithiocarbamic salts of any metallic element may be prepared. Among such salts, the more important appear to be the salts of monovalent and divalent elements such as potassium, lithium, calcium, barium, iron, chromium, copper, lead, mercury, manganese, magnesium and tin. Other salts may be prepared such as the salts of ammonia and substituted ammonias such as:

Mono-methyl-ammonium-hexamethylene-dithiocarbamate
Dimethyl-ammonium-hexamethylene-dithiocarbamate
Diethyl-ammonium-hexamethylene-dithiocarbamate
Dibutyl-ammonium-hexamethylene-dithiocarbamate
Hexyl-ammonium-hexamethylene-dithiocarbamate
Dicyclohexyl-ammonium-hexamethylene-dithiocarbamate
Mono-phenyl-ammonium-hexamethylene-dithiocarbamate
Diphenyl-ammonium-hexamethylene-dithiocarbamate
Mono-tolyl-ammonium-hexamethylene-dithiocarbamate
Ditolyl-ammonium-hexamethylene-dithiocarbamate
Piperdinium-hexamethylene-dithiocarbamate
Pyridinium-hexamethylene-dithiocarbamate
Diphenyl-guanidine salt of hexamethylene dithiocarbamic acid
Ethanolamine salt of hexamethylene dithiocarbamic acid
Hexamethylene-tetramine salt of hexamethylene dithiocarbamic acid
Hexamethylene-diimine salt of hexamethylene dithiocarbamic acid
1:6-hexane-diamine salt of hexamethylene dithiocarbamic acid
Diaryl-guanidine salts of hexamethylene dithiocarbamic acid Further various esters of the hexamethylene dithiocarbamic acid may be prepared as follows:

Di-nitro-chlorphenyl-hexamethylene-dithio-carbamate
Picryl-hexamethylene-dithio-carbamate
Phenyl-hexamethylene-dithio-carbamate
Naphthyl-hexamethylene-dithio-carbamate
Anthracyl-hexamethylene-dithio-carbamate
Ethyl-hexamethylene-dithio-carbamate
Propyl-hexamethylene-dithio-carbamate
Butyl-hexamethylene-dithio-carbamate
Isobutyl-hexamethylene-dithio-carbamate
Lauryl-hexamethylene-dithio-carbamate
Oleyl-hexamethylene-dithio-carbamate
Benzoyl-hexamethylene-dithio-carbamate
Dimethyl-carbamyl-hexamethylene-dithio-carbamate
Diethyl-carbamyl-hexamethylene-dithio-carbamate
Dibutyl-carbamyl-hexamethylene-dithio-carbamate
Diphenyl-carbamyl-hexamethylene-dithio-carbamate
Phenyl-methyl-carbamyl-hexamethylene-dithio-carbamate
Ditolyl-carbamyl-hexamethylene-dithio-carbamate
Phenyl-ethyl-carbamyl-hexamethylene-dithio-carbamate
Tolyl-methyl-carbamyl-hexamethylene-dithio-carbamate
Tolyl-ethyl-carbamyl-hexamethylene-dithio-carbamate
Phenyl-butyl-carbamyl-hexamethylene-dithio-carbamate In other words, esters may be made by the esterification of alcohols or phenols, or by the reaction of a metal salt of hexamethylene-dithio-carbamic acid with an acid chloride such as benzoyl chloride or acetyl chloride or a carbamyl chloride such as diphenyl carbamyl. Many other salts and esters will be readily apparent to those skilled in the art.

Numerous other derivatives can be prepared which are the equivalent of those shown in the examples.

These various salts, esters, and sulfides of hexamethylene dithiocarbamic acid have been found to be excellent accelerators for the vulcanization of rubber. The salts, in particular, are excellent accelerators for rubber latex, giving strong, fast cures. The excellent stability of these compounds in aqueous solution or suspension makes their use especially desirable. For example, the salts of hexamethylene dithiocarbamic acid are all more active accelerators of rubber latex vulcanization than the corresponding piperidine derivatives. When used in equal quantities all give a higher modulus of cure than the piperidine derivatives. In fact, three-fourths as much of the hexamethylene imine derivatives will generally give higher moduli and about the same final tensiles as a given quantity of the corresponding piperidine derivatives. This superiority is illustrated by the following tests which were made on the following rubber latex mixtures:

Rubber (as 60% latex) ----------------- 100
Zinc oxide ---------------------------- 2
Sulfur -------------------------------- 1.5
Accelerator --------------------- As indicated Plate films were cast from each mix, dried in a moist air oven at 50° for 3½ hours, and vulcanized. The 0 minute cure had no other cure than that which took place on drying.

In the following table, A represents the hexamethylene imine salt of hexamethylene dithiocarbamate, while B represents piperidine pentamethylene dithiocarbamate. C represents the potassium salt of hexamethylene dithiocarbamic acid, and D represents the potassium salt of pentamethylene dithiocarbamic acid.

Table I

| Minutes cured at 100° C. | .5% of A | .5% of B | .375% of A | .5% of C | .5% of D |
|---|---|---|---|---|---|
| MODULUS IN LBS./SQ. IN. AT 700% ELONGATION ||||||
| 0 | 975 | 475 | 450 | 2250 | 975 |
| 15 | 1350 | 575 | 750 | 2250 | 1500 |
| 30 | 2700 | 1200 | 1250 | 2850 | 1525 |
| 45 | 3300 | 1850 | 1325 | 2725 | 1700 |
| 60 | 2700 | 2375 | 1250 | 2900 | 1600 |
| TENSILE AT BREAK IN LBS./SQ. IN. ||||||
| 0 | 3775 | 2050 | 2250 | 5250 | 4000 |
| 15 | 4500 | 3225 | 3225 | 4775 | 4875 |
| 30 | 5450 | 4650 | 5250 | 4900 | 4900 |
| 45 | 5275 | 4625 | 4550 | 5300 | 4900 |
| 60 | 5275 | 4600 | 4900 | 5275 | 4875 |

Table II shows the cures obtained by the use of various other salts and esters of hexamethylene dithiocarbamic acid. These compounds all give good cures with high moduli and tensiles and may be used for the vulcanization of either dry rubber or rubber latex.

The following rubber stocks were used for these tests:

|  | A | B |
|---|---|---|
| Smoked sheets | 100 | 100 |
| Channel black |  | 25 |
| Zinc oxide | 5 | 5 |
| Stearic acid | 1 | 1 |
| Sulfur | 3 | 3 |
| Accelerator | .5 | .5 |

Table II

| Accelerator | Stock | Minutes cured at 259° F. | Modulus lbs./sq. in. at 600% elongation | Tensile at break, lbs./sq. in. | Elongation at break |
|---|---|---|---|---|---|
| Zinc hexamethylene dithiocarbamate | A | 20 | 1075 | 3600 | 770 |
| | A | 30 | 1000 | 3550 | 780 |
| Do | B | 20 | 2925 | 4625 | 730 |
| | B | 30 | 3275 | 4475 | 680 |
| Lead hexamethylene dithiocarbamate | A | 20 | 1300 | 3250 | 720 |
| | A | 30 | 1350 | 3350 | 720 |
| Do | B | 20 | 3700 | 4925 | 680 |
| | B | 30 | 4350 | 4775 | 620 |
| Cadmium hexamethylene dithiocarbamate | A | 20 | 1475 | 4575 | 760 |
| | A | 30 | 1400 | 4350 | 770 |
| Do | B | 20 | 3275 | 5300 | 740 |
| | B | 30 | 3475 | 4875 | 700 |
| 1%-2, 4-dinitrophenyl hexamethylene dithiocarbamate | B | 20 | 1550 | 2825 | 750 |
| | B | 45 | 3300 | 4600 | 670 |

The dihexamethylene thiuram mono- and disulfides are also excellent accelerators, giving stocks which have very good resistance to deterioration after ageing. The dihexamethylene thiuram disulfide gives especially good cures in stocks containing no free sulfur. The excellence of these accelerators is illustrated in the following tables.

The thiuram monosulfide was used in the following formula:

| | |
|---|---|
| Smoked sheets | 100 |
| Zinc oxide | 5 |
| Stearic acid | 1 |
| Sulfur | 3 |
| Accelerator | 0.2 |

Table III

| Accelerator | Min./# steam cure | Modulus in lbs./sq. in. , 600% elongation | Tensile at break in lbs./sq. in. | Elongation at break |
|---|---|---|---|---|
| Dihexamethylene thiuram monosulfide | 30/10 | No cure | No cure | |
| | 5/40 | 475 | 3175 | 890 |
| | 20/40 | 775 | 3900 | 820 |
| Tetramethyl thiuram monosulfide | 30/10 | No cure | No cure | |
| | 5/40 | 325 | 2625 | 930 |
| | 20/40 | 925 | 3775 | 780 |

The dihexamethylene thiuram disulfide was tested in the following two formulas:

| | A | B |
|---|---|---|
| Smoked sheets | 100 | 100 |
| Zinc oxide | 5 | 5 |
| Stearic acid | 1 | 1 |
| Sulfur | 2 | 1 |
| Accelerator | 0.3 | 3.0 |

The results of the tests were as follows:

Table IV

| Accelerator | Formula | Min./# steam cure | Modulus in lbs./sq. in. at 600% elongation | Tensile at break in lbs./sq. in. | Elongation at break |
|---|---|---|---|---|---|
| Dihexamethylene thiuram disulfide | A | 20/10 | No cure | No cure | |
| | A | 5/40 | 550 | 3550 | 880 |
| | A | 10/40 | 650 | 4250 | 850 |
| Dipentamethylene thiuram disulfide | A | 20/10 | 350 | 2675 | 920 |
| | A | 5/40 | 400 | 2600 | 900 |
| | A | 10/40 | 600 | 3200 | 850 |
| Dihexamethylene thiuram disulfide | B | 60/10 | No cure | No cure | |
| | B | 5/40 | 400 | 1050 | 800 |
| | B | 30/40 | 450 | 2425 | 840 |
| Dipentamethylene thiuram disulfide | B | 60/10 | 125 | 1500 | 980 |
| | B | 5/40 | 150 | 1350 | 960 |
| | B | 30/40 | 575 | 2675 | 840 |
| Tetraethyl thiuram disulfide | B | 60/10 | No cure | No cure | |
| | B | 5/40 | No cure | No cure | |
| | B | 30/40 | 475 | 1275 | 740 |

The methods of use of the compounds of my invention, as illustrated by the examples given, are merely illustrative. These accelerators may be used in amounts ranging from less than 0.1% to 3% or more. They may be used together with any combination of compounding ingredients such as reinforcing pigments, semi-reinforcing pigments, fillers, rubber substitutes, factice, reclaimed rubber, antioxidants, softeners, and the like. Also, these accelerators may be used in combination with each other to produce good results.

This is a continuation-in-part of my copending application, Serial No. 212,978, filed June 10, 1938, for "Derivatives of hexamethylene-dithiocarbamic acid," patented January 23, 1940, as Patent 2,187,719, in which the accelerators of this present application are claimed as new chemical compounds.

While I have disclosed the preferred embodiments of my invention and the preferred modes of carrying the same into effect, it will be readily apparent that many variations and modifications may be made therein, particularly in the derivatives employed, the composition of the rubber stocks in which they are incorporated, and the conditions of vulcanization, without departing from the spirit of my invention. Accordingly, the scope of my invention is not to be limited to the examples specifically given hereinbefore, but it will be understood that I intend to claim my invention broadly as set forth in the appended claims.

I claim:

1. The method of vulcanizing rubber which comprises incorporating into a rubber mix, prior to vulcanization, a small proportion of a hexamethylene dithiocarbamic acid compound of the group consisting of salts of hexamethylene dithiocarbamic acid, thiuram sulfides of hexamethylene dithiocarbamic acid and esters of hexamethylene dithiocarbamic acid.

2. The method of vulcanizing rubber which comprises incorporating into a rubber mix, prior to vulcanization, a small proportion of a salt of hexamethylene dithiocarbamic acid.

3. The method of vulcanizing rubber which comprises incorporating into a rubber mix, prior to vulcanization, a small proportion of a metal salt of hexamethylene dithiocarbamic acid.

4. The method of vulcanizing rubber which comprises incorporating into a rubber mix, prior to vulcanization, a small proportion of zinc hexamethylene dithiocarbamate.

5. The method of vulcanizing rubber which comprises incorporating into a rubber mix, prior to vulcanization, a small proportion of an ammonium salt of hexamethylene dithiocarbamic acid.

6. The method of vulcanizing rubber which comprises incorporating into a rubber mix, prior to vulcanization, a small proportion of the hexamethylene imine salt of hexamethylene dithiocarbamic acid.

7. The method of vulcanizing rubber which comprises incorporating into a rubber mix, prior to vulcanization, a small proportion of a hexamethylene thiuram sulfide.

8. The method of vulcanizing rubber which comprises incorporating into a rubber mix, prior to vulcanization, a small proportion of di-hexamethylene thiuram di-sulfide.

9. Rubber having incorporated therein, as a vulcanization accelerator, a small proportion of a hexamethylene dithiocarbamic acid compound of the group consisting of salts of hexamethylene dithiocarbamic acid, thiuram sulfides of hexamethylene dithiocarbamic acid and esters of hexamethylene dithiocarbamic acid.

10. Rubber having incorporated therein, as a vulcanization accelerator, a small proportion of di-hexamethylene thiuram di-sulfide.

11. Rubber having incorporated therein, as a vulcanization accelerator, a small proportion of a metal salt of hexamethylene dithiocarbamic acid.

12. Rubber having incorporated therein, as a vulcanization accelerator, a small proportion of an ammonium salt of hexamethylene dithiocarbamic acid.

13. Rubber having incorporated therein, as a vulcanization accelerator, a small proportion of a hexamethylene thiuram sulfide.

14. Rubber having incorporated therein, as a vulcanization accelerator, a small proportion of zinc hexamethylene dithiocarbamate.

15. Rubber having incorporated therein, as a vulcanization accelerator, a small proportion of the hexamethylene imine salt of hexamethylene dithiocarbamic acid.

16. Rubber having incorporated therein, as a vulcanization accelerator, a small proportion of a salt of hexamethylene dithiocarbamic acid.

IRA WILLIAMS.